March 15, 1932. E. F. DAUTEUIL 1,850,000
DISTRIBUTING APPARATUS FOR CONICAL CORKS
Filed May 13, 1931 2 Sheets-Sheet 1

E. F. Dauteuil
INVENTOR
By: Marks & Clerk
Attys.

March 15, 1932. E. F. DAUTEUIL 1,850,000
DISTRIBUTING APPARATUS FOR CONICAL CORKS
Filed May 13, 1931 2 Sheets-Sheet 2

E. F. Dauteuil
INVENTOR

By: Marks & Clerk
Attys.

Patented Mar. 15, 1932

1,850,000

UNITED STATES PATENT OFFICE

EDOUARD FERNAND DAUTEUIL, OF ST.-DENIS, FRANCE

DISTRIBUTING APPARATUS FOR CONICAL CORKS

Application filed May 13, 1931, Serial No. 537,163, and in Germany January 29, 1929.

This invention relates to a distributing apparatus for conical corks which is specially designed for feeding machines for corking simultaneously a number of bottles, flasks or other receptacles.

The apparatus in accordance with the invention is characterized substantially by the fact that the corks are deposited in bulk into a receptacle and are led therefrom into the wider opening of inclined conical drums which are rotated continuously in such a manner that the corks on coming into contact with the internal wall of the said drums are caused to rotate at a circumferential speed which differs at each end of the said corks with the result that they are automatically arranged one after the other with their smaller end directed towards the smaller discharge opening of the drums to which they are moved automatically from the larger entrance opening and are discharged therefrom in succession with their smaller end in front.

In the preferred form of construction of the apparatus in accordance with the invention the receptacle containing the corks in bulk is constructed with an inclined bottom and an opening in the side wall opposite to the said bottom through which the conical corks are discharged into a horizontal rotating cylindrical drum which is provided longitudinally with a single row of circular openings to enable the corks to be discharged at each revolution of the drum.

This cylindrical rotating drum is mounted above hoppers which correspond in number with the number of the openings in the said drum and which are each intended to receive a cork that falls from one of the said openings. The hoppers communicate through channels with receiving spouts, each of which discharges into the larger or entrance opening of the rotating conical drums having an inclined axis for the purpose of supplying the said drums with corks, whilst each of the conical drums is provided with an overflow opening to enable the supply of corks to be controlled.

In order to make the matter clear one form of construction of the apparatus for distributing conical corks in accordance with the present invention will be hereinafter described with reference to the accompanying drawings.

Figure 1:
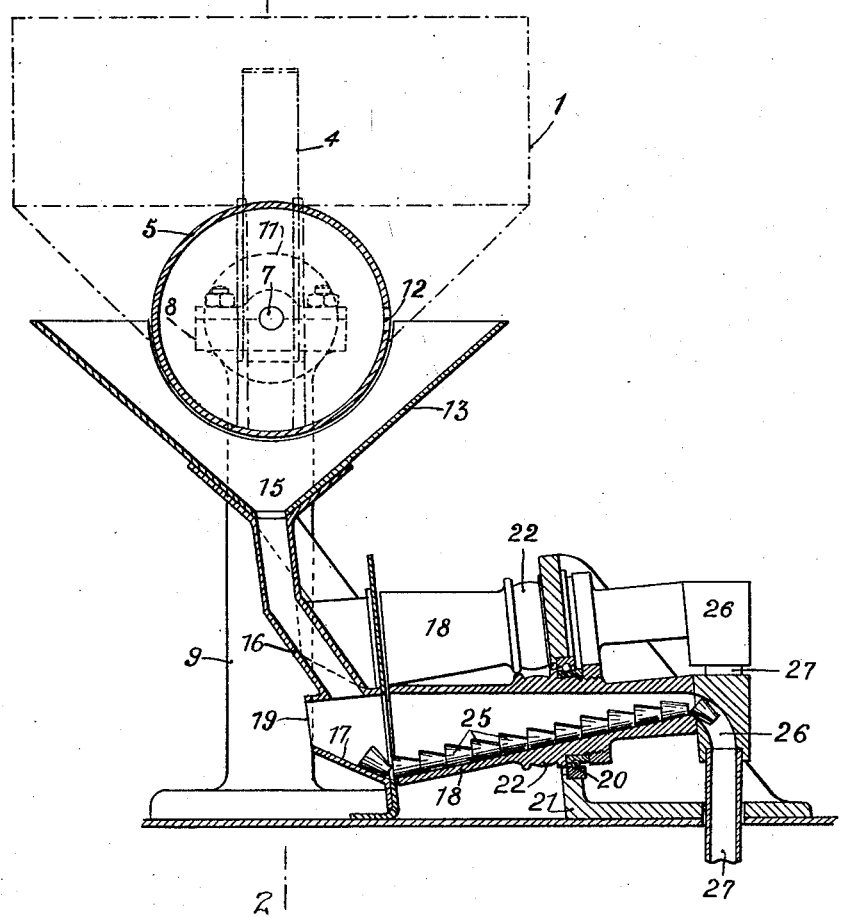
Fig. 1 is a vertical longitudinal section corresponding to the line 1—1 of Fig. 2.
Figure 2:
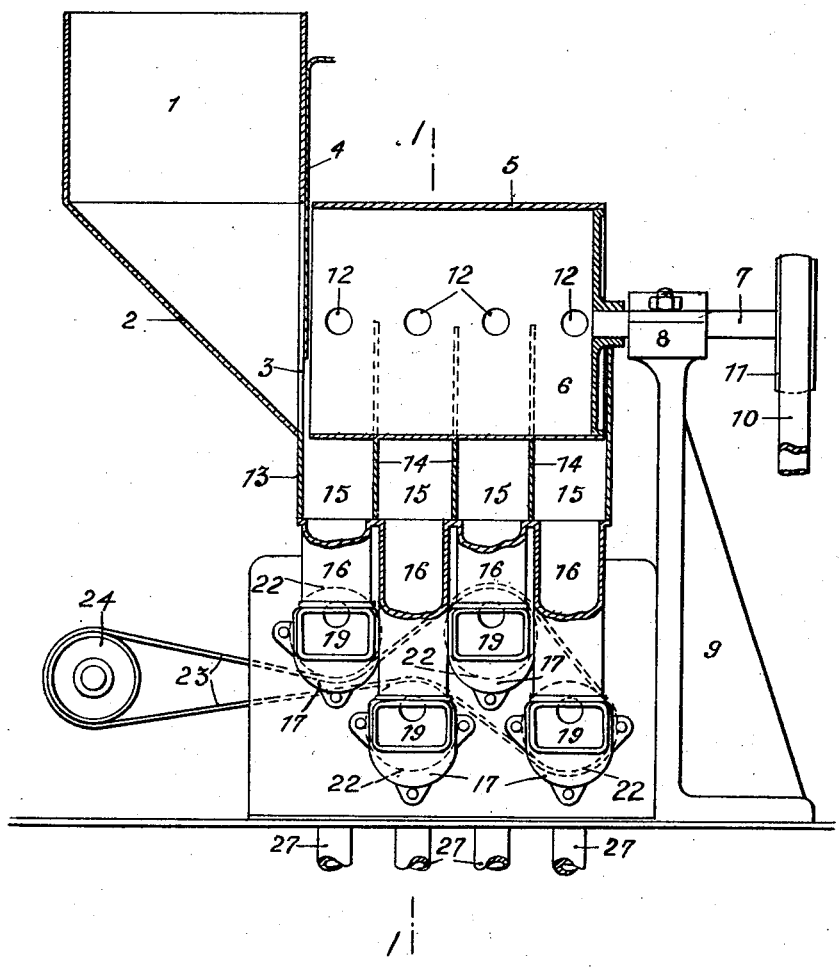
Fig. 2 is an end view, partly in section, corresponding to the line 2—2 of Fig. 1.

As shown in the accompanying drawings the apparatus in accordance with the invention comprises substantially a receptacle 1 which is intended to hold the conical corks deposited in bulk into the said receptacle. This receptacle of which the bottom 2 is inclined has an opening 3 cut in the wall opposite to the said bottom for the discharge of the corks, the said opening being controlled by a vertical slide 4.

The discharge opening 3 of the receptacle 1 delivers the corks into a horizontal cylindrical drum 5 which is closed at one end by a cover 6 that is keyed on a shaft 7. The said shaft 7 rotates in a bearing 8 on a suitable pedestal 9, being driven, for example, by a motor of any kind through a belt 10 and a pulley 11.

A single row of circular openings 12 is cut longitudinally in the wall of the drum 5, the diameter of the said openings being such that the conical corks that fall by gravity in the said drum can be discharged therefrom during each revolution thereof when the row of discharge openings 12 is in a suitable position for the ejection of the said corks.

As will be obvious from the drawings the lower half of the drum 5 is mounted in a sort of trough 13 of which the longitudinal walls are inclined and connected together by transverse partitions 14 so as to divide up the interior of the trough 13 into the same number of hoppers 15 as there are discharge openings 12 in the drum 5.

From the foregoing description it will be understood that when the row of orifices 12 is at the bottom of the drum during each revolution a cork falls through each orifice 12 into each hopper 15.

Each hopper is provided at its base with a tube or channel 16 which places it in communication with a receiving spout 17 and leads into the said spout the conical corks that are distributed in succession into the corresponding hopper through the discharge opening 12 at each revolution of the feed drum 5.

The receiving spouts 17 corresponding in number to the openings 12 and the hoppers 15 are intended to feed the axially inclined conical drums 18 with corks, and are arranged for this purpose to discharge into the lower opening of larger diameter of the said drums 18, whilst on the other hand they are provided with an overflow opening 19 to prevent jamming in the event of the spouts being filled too quickly by enabling the excess of corks to be discharged outside of the said spouts.

As will be seen from the drawings the conical drums 18 are supported in ball bearings 20 in a right-angled bracket 21 and are each provided with a pulley 22 to enable them to be rotated by means of a single belt 23 that passes over a driving pulley 24 and over each pulley 22 that is integral with each drum 18.

The upper opening of each drum 18 is slightly larger in diameter than the diameter of the larger end of the conical corks 25 and discharges into a guide passage 26 to which a tube 27 is connected for the purpose of leading the corks ejected by each of the drums 18 to the place at which they are to be used.

When the receptacle 1 has been filled with conical corks delivered in bulk therein the cylindrical drum 5 and the conical drums 18 are set in motion and the hereinbefore-described apparatus acts in the following manner:—

The corks 25 which are guided by the inclined bottom 2 of the receptacle 1 fall into the cylindrical drum 5 after the slide 4 has been opened and collect in the lower portion of the said drum.

During the rotation of the drum the openings 12 move into the interior of the hoppers 15 and each opening discharges a cork which is led by the tube or channel 16 of the said hopper into the corresponding receiving spout 17. When the receiving spouts contain a certain number of corks they are discharged in any position into the interior of the rotating conical drums 18 through the lower opening of larger diameter.

The corks are therefore brought into contact with the internal wall of the said drums and are rotated on their longitudinal axis at a different circumferential velocity at each end. Owing to this difference in velocity the corks arrange themselves automatically one after the other in the bottom of the drums 18 with their smaller end directed towards the upper opening of smaller diameter of the said drums to which they are automatically fed.

On leaving the drums 18 the corks overbalance, as shown in Fig. 1, and fall into the tubes or channels 27 which lead them with their smaller end in front to the place at which they are to be used.

The hereinbefore-described arrangements are, of course, given only by way of example and the form, material and dimensions of the constituent parts as well as the constructional details may be modified without in any way departing from the invention.

Thus, for example, the apparatus hereinbefore-described for the purpose of effecting the simultaneous distribution of any number of corks might be applied to the automatic distribution of a single conical cork by employing a drum 5 with a single opening 12, a single hopper 15 and a single drum 18.

I claim:

1. An apparatus for distributing, to a corking or like machine, conical corks with the smaller end forward, comprising, a conical drum having an inclined axis and adapted to receive, in its opening of large diameter, the conical corks in bulk, means for transmitting to the said drum a continuous rotary movement about its axis in order to impart to the corks, by simple contact of the latter with the inner conical wall of the said drum, a movement of rotation of different speed at each base and to automatically obtain the placing in position of these corks one after the other along the lower generatrix of the drum in such a position that the said corks are directed with their smaller end forward and driven towards the opening of small diameter of the drum, through which opening these corks are automatically evacuated with their smaller end forward in correct corking position, means connected to this outlet opening of the drum for leading the corks with the smaller end forward at the place where they are to be used.

2. An apparatus for distributing, to a corking or like machine, conical corks with the smaller end forward, comprising, a vessel containing the corks in bulk, means for controlling the issue of the corks from the said vessel, a rotary cylindrical drum having a horizontal axis, open at one of its ends and adapted to receive the corks when they issue from the said vessel, a row of openings cut out in the said drum according to a generatrix of the latter and adapted to ensure the ejection of the corks at each revolution of the said drum, rotary conical drums having an inclined axis and adapted to receive, in their opening of large diameter, the corks ejected by the perforated cylindrical drum, means interposed between this perforated cylindrical drum and the rotary conical drums having an inclined axis and adapted to lead in the latter the corks ejected by the said cylindrical drum.

3. An apparatus for distributing, to a corking or like machine conical corks with their small end forward, comprising, a vessel containing the corks to be distributed discharged in bulk in the said vessel, an inclined bottom closing this vessel and adapted to guide the corks towards an outlet orifice, a trap door controlling the section of this orifice and consequently the issue of the corks, a rotary cylindrical drum having a horizontal axis, open at one of its ends and adapted to receive the corks when they issue from the said vessel, a row of openings cut out in the said drum according to a generatrix of the latter and adapted to ensure the ejection of the corks at each revolution of the said drum, rotary conical drums having an inclined axis and adapted to receive, in their opening of large diameter, the corks ejected by the perforated cylindrical drum, means interposed between this perforated cylindrical drum and the rotary conical drums having an inclined axis and adapted to lead in the latter the corks ejected by the said cylindrical drum.

4. An apparatus for distributing, to a corking or like machine, conical corks with their small end forward, comprising, a vessel containing the corks to be distributed discharged in bulk in the said vessel, an inclined bottom closing this vessel and adapted to guide the corks towards an outlet orifice, a trap door controlling the section of this orifice and consequently the issue of the corks, a rotary cylindrical drum having a horizontal axis, open at one of its ends and adapted to receive the corks when they issue from the said vessel, a row of openings cut out in the said drum according to a generatrix of the latter and adapted to ensure the ejection of the corks at each revolution of the said drum, rotary conical drums having an inclined axis and adapted to receive, in their opening of large diameter, the corks ejected by the perforated cylindrical drum, hoppers interposed between this perforated cylindrical drum and the rotary conical drums having an inclined axis, and adapted to collect the corks falling from the openings of the cylindrical drum and to lead these corks in the rotary conical drums.

The foregoing specification of my "Distributing apparatus for conical corks", signed by me this 2nd day of May, 1931.

EDOUARD FERNAND DAUTEUIL.